(12) United States Patent
Iwasaki et al.

(10) Patent No.: US 10,052,728 B2
(45) Date of Patent: Aug. 21, 2018

(54) ASSEMBLING APPARATUS AND ASSEMBLING METHOD

(71) Applicant: KOITO MANUFACTURING CO., LTD., Minato-ku, Tokyo (JP)

(72) Inventors: Dai Iwasaki, Shizuoka (JP); Yasuo Tachibana, Shizuoka (JP); Hiroyuki Yamauchi, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/312,938

(22) Filed: Jun. 24, 2014

(65) Prior Publication Data

US 2014/0373337 A1 Dec. 25, 2014

(30) Foreign Application Priority Data

Jun. 25, 2013 (JP) .................. 2013-132405

(51) Int. Cl.
*B23P 19/04* (2006.01)
*B23P 19/10* (2006.01)
*B25J 15/00* (2006.01)

(52) U.S. Cl.
CPC ............... *B23P 19/04* (2013.01); *B23P 19/10* (2013.01); *B25J 15/009* (2013.01);
(Continued)

(58) Field of Classification Search
CPC ......... Y10T 29/49895; Y10T 29/49899; Y10T 29/49902; Y10T 29/53261; Y10T 29/53174–29/53183; Y10T 29/53191; Y10T 29/53196; Y10T 29/53265; Y10T 29/53961; Y10T 29/53978; B23P 19/10; B23P 19/12; B23P 11/00; B23P 19/04;
(Continued)

(56) References Cited

U.S. PATENT DOCUMENTS

| 4,919,586 A * | 4/1990 | Derby ..................... B23Q 3/18 |
| | | 414/626 |
| 5,314,223 A * | 5/1994 | Harper, Jr. ......... H05K 13/0408 |
| | | 29/743 |

(Continued)

FOREIGN PATENT DOCUMENTS

| JP | S 60-135193 A | 7/1985 |
| JP | S 60-228096 A | 11/1985 |

(Continued)

OTHER PUBLICATIONS

Office Action dated Feb. 21, 2017, issued by the Japanese Patent Office in counterpart Japanese Application No. 2013-132405.

*Primary Examiner* — Matthew P Travers
(74) *Attorney, Agent, or Firm* — Sughrue Mion, PLLC (57) ABSTRACT

An assembling apparatus configured to mount a first part on a second part having an engaged part extending in a first direction includes a holding part configured to hold the first part, an engaging part extending in the first direction and being configured to engage with the engaged part, a support part configured to support the holding part and the engaging part, a first mechanism configured to displace the support part in the first direction, and a second mechanism configured to allow a displacement of the support part in a plane intersecting with the first direction.

4 Claims, 8 Drawing Sheets

(52) U.S. Cl.
CPC .... *Y10T 29/49895* (2015.01); *Y10T 29/49998* (2015.01); *Y10T 29/53261* (2015.01); *Y10T 29/53961* (2015.01)

(58) Field of Classification Search
CPC ....... B23P 19/102; B23P 15/08; B25J 15/009; B25J 15/0071; B25J 15/0095
See application file for complete search history.

(56) References Cited

U.S. PATENT DOCUMENTS

| | | | | |
|---|---|---|---|---|
| 6,402,528 B2* | 6/2002 | Takahashi | .............. | H01R 12/88 439/70 |
| 6,895,647 B2* | 5/2005 | Matsumoto | ............ | B62D 65/02 269/51 |
| 8,720,876 B2* | 5/2014 | Reith | ....................... | B23Q 1/64 269/57 |
| 2002/0088113 A1* | 7/2002 | Hwang | ................... | G01R 31/01 29/743 |
| 2002/0192067 A1* | 12/2002 | Prodel | ................... | B23P 19/001 414/799 |
| 2003/0019090 A1* | 1/2003 | Matsumoto | ............ | B62D 65/02 29/428 |
| 2003/0131459 A1* | 7/2003 | Morita | ..................... | B23P 19/02 29/242 |
| 2005/0125994 A1* | 6/2005 | Hoppe | ............... | G01R 31/2893 29/739 |
| 2009/0217506 A1* | 9/2009 | Schmidt | ................ | B23P 19/062 29/525 |
| 2010/0246204 A1* | 9/2010 | Inaba | ................... | F21S 48/1159 362/539 |
| 2011/0176900 A1* | 7/2011 | Hsieh | ................... | B25J 15/0616 414/752.1 |
| 2013/0312242 A1* | 11/2013 | Tamagawa | ........... | B62D 25/147 29/464 |

FOREIGN PATENT DOCUMENTS

| | | |
|---|---|---|
| JP | S 60-249585 A | 12/1985 |
| JP | H 2-88929 A | 3/1990 |
| JP | H 3-505306 A | 11/1991 |
| JP | 2009-140945 A | 6/2009 |
| WO | WO 2012037598 A1 * | 3/2012 ............ B25J 11/005 |

* cited by examiner

ASSEMBLING APPARATUS AND ASSEMBLING METHOD

CROSS-REFERENCE TO RELATED APPLICATION

The present application claims priority from Japanese Patent Application No. 2013-132405 filed on Jun. 25, 2013, the entire content of which is incorporated herein by reference.

BACKGROUND OF INVENTION

Field of Invention

The present invention relates to an assembling apparatus and an assembling method, which are used in a process for mounting a first part on a second part. Particularly, the present invention relates to an assembling apparatus and an assembling method for mounting a semiconductor light emitting device on a support body, which is provided in a lighting device to be mounted on a vehicle.

Related Art

There has been known an assembling apparatus that enhances the mounting accuracy of the first part on the second part by using an image recognition technology (see, e.g., Patent Document 1: JP 2009-140945A).

Particularly in a lighting device to be mounted on a vehicle, high accuracy is required for positioning of each component constituting an optical system. However, in the case of using an image recognition technology so as to achieve the high accuracy, an increase in facility cost is caused.

SUMMARY OF INVENTION

Exemplary embodiments of the invention provide assembling apparatus and an assembling method which can mount a first part on a second part with high positioning accuracy while suppressing the facility cost.

According to an exemplary embodiment of the present invention, an assembling apparatus configured to mount a first part on a second part having an engaged part extending in a first direction, includes:

a holding part configured to hold the first part;

an engaging part extending in the first direction and being configured to engage with the engaged part;

a support part configured to support the holding part and the engaging part;

a first mechanism configured to displace the support part in the first direction; and a second mechanism configured to allow a displacement of the support part in a plane intersecting with the first direction.

According to an exemplary embodiment of the present invention, an assembling method includes:

holding a first part by a holding part;

positioning the holding part relative to a second part by engaging an engaging part extending in a first direction with an engaged part being formed on the second part and extending in the first direction;

mounting the first part held by the holding part on the second part; and releasing the holding of the first part mounted on the second part, wherein, in the positioning, a support member configured to support the holding part and the engaging part is allowed to displace in a plane intersecting with the first direction.

According to the configurations described above, the engagement of the engaging part with the engaged part proceeds in association with the displacement of the support part in the first direction. Even in the case where some positional deviation between the engaging part and the engaged part occurs at the start of the engagement, the displacement of the support part in the plane, which eliminates the positional deviation, is allowed by the second mechanism. Since the engagement of the engaging part with the engaged part is securely made, the position of the holding part supported by the support part with respect to the second part can be also determined with high accuracy. Accordingly, the first part can be accurately mounted on the second part without using an image recognition technology associated with an increase in facility cost. Further, since the engagement of the engaging part with the engaged part does not proceed in a state where a positional deviation occurs, it is possible to avoid the damage of these parts.

The assembling apparatus may have a third mechanism and a control part. The third mechanism restricts the displacement of the support part in the plane. The control part controls the second mechanism to allow the displacement of the support part when engaging the engaging part with the engaged part and controls the third mechanism to restrict the displacement of the support part when the holding part mounts the first part on the second part.

That is, in the above-described assembling method, the displacement of the support part in the plane is restricted in the mounting process.

Specifically, at least in the case of positioning the holding part relative to the second part, the displacement of the support part in the plane is allowed. On the other hand, at least in the case of mounting the first part on the second part by the holding part, the displacement of the support part in the plane is restricted. In this way, a mounting operation of the first part by the holding part can be stably made. Accordingly it is possible to mount the first part on the second part with high accuracy.

For example, the holding part includes a first gripping member and a second gripping member. The first gripping member and the second gripping member are arranged in a second direction along the plane and are configured to grip the first part by changing a relative distance in the second direction. In this case, it is possible to reliably and precisely hold the light source with a simple configuration.

The engaging part may include a first engaging part and a second engaging part. The first engaging part is configured to engage with a first engaged member formed on the second part and the second engaging part is configured to engage with a second engaged member formed on the second part. In this case, the rotation of the support part in the plane is prevented by two engaging parts and therefore the holding part can be more securely positioned relative to the second part.

The first engaging member and the second engaging member may be arranged axisymmetrically with respect to a straight line passing through a position at which a central portion of the first part held by the holding part is disposed. In this case, it is possible to enhance the stability of the positioning operation.

The first engaging member and the second engaging member may be arranged point-symmetrically with respect to a straight line passing through a position at which a central portion of the first part held by the holding pan is disposed. In this case, it is possible to maximally enhance the stability of the positioning operation.

The first part in the assembling apparatus and assembling method is a semiconductor light emitting device which is provided in a lighting device to be mounted on a vehicle and the second part is a support body supporting the semiconductor light emitting device thereon.

In this case, it is preferable that the engaging part is a pin which can be inserted into a round hole as the engaged part. The light emitted from the semiconductor light emitting device mounted in the lighting device as a final product can be prevented from being hindered by the pin-like engaged part. Further, it is possible to suppress the forming cost of the support body.

DETAILED DESCRIPTION

Hereinafter, exemplary embodiments of the present invention will be described in detail with reference to the accompanying drawings. However, the following exemplary embodiments do not limit the scope of the claimed invention. In the drawings, the scale is changed as appropriate so that each member is illustrated with a recognizable size.

Figure 1:
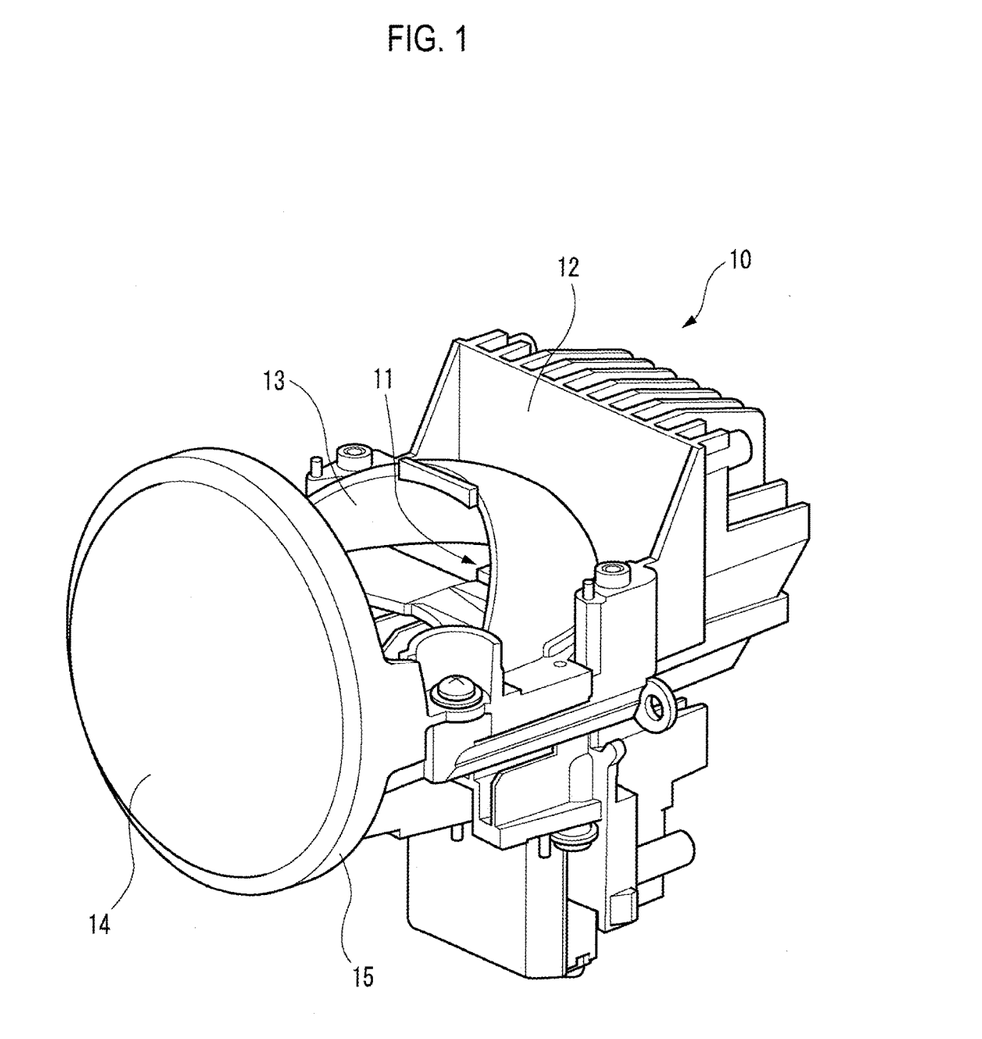
FIG. 1 is a perspective view showing an appearance of a lighting device including a part manufactured by an assembling apparatus according to an exemplary embodiment of the present invention.

FIG. 1 shows a lamp unit 10 as an example of a lighting device that is mounted on a vehicle. The lamp unit 10 includes a light source 11, a heat sink 12, a reflector 13, a projection lens 14, and a lens holder 15.

The light source 11 is a light emitting element package in which a semiconductor light emitting element such as a white light emitting diode (LED) or an organic EL element is mounted on a high heat-dissipation circuit board. The light emitting element package is fixed to the heat sink 12. The heat sink 12 has a material and shape suitable for dissipating the heat generated from the light source 11.

The light emitted from the light source 11 is reflected by the reflector 13 and then directed to the front. At least a portion of the light passes through the projection lens 14 disposed in front of the reflector 13. The projection lens 14 is fixed to the heat sink 12 in such a way that a peripheral edge thereof is held by the lens holder 15.

Figure 2:
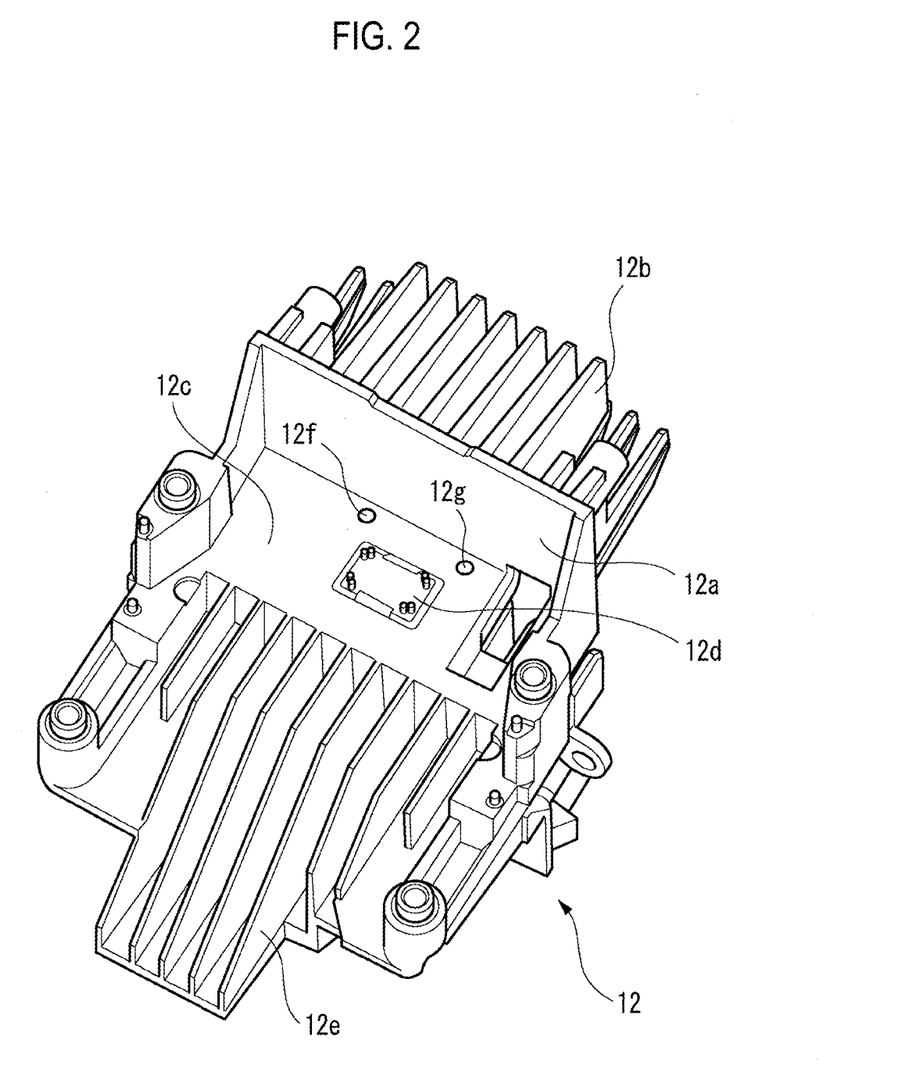
FIG. 2 is a perspective view showing an appearance of a heat sink provided in the lighting device.

FIG. 2 is a perspective view showing an appearance of only the heat sink 12 provided in the lamp unit 10. The heat sink 12 includes a back plate 12a. A plurality of heat-dissipation plates 12b extend rearward from the back side of the back plate 12a. A base 12c is provided in front of the back plate 12a. A light source mounting portion 12d is provided on the upper surface of the base 12c. A plurality of heat-dissipation plates 12e extend forward from the front side of the base 12c. In a portion of the base 12c between the back plate 12a and the light source mounting portion 12d, a first round hole 12f and a second round hole 12g are formed. The first round hole 12f and the second round hole 12g are opened on the upper surface of the base 12c, respectively.

Figure 3A:
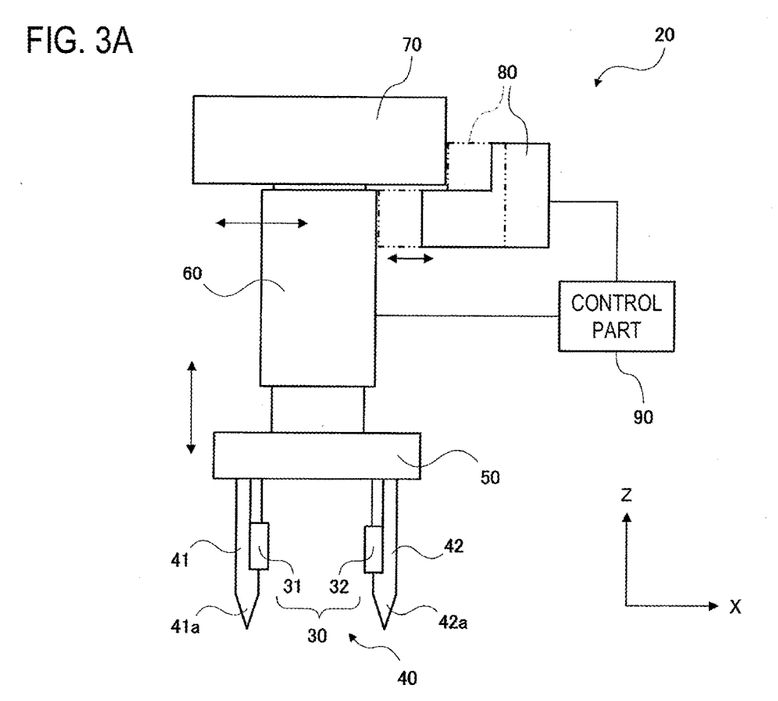
FIGS. 3A and 3B are views showing a schematic configuration of the assembling apparatus.

FIG. 3A is a front view schematically showing a configuration of an assembling apparatus 20 according to one illustrative embodiment of the present invention. The assembling apparatus 20 is an apparatus for mounting the light source (light emitting element package) 11 on the light source mounting portion 12d of the heat sink 12. The assembling apparatus 20 includes a holding part 30, an engaging part 40, a support part 50, a first mechanism 60, a second mechanism 70, a third mechanism 80 and a control part 90.

The holding part 30 includes a first gripping member 31 and a second gripping member 32. The first gripping member 31 and the second gripping member 32 are configured such that the light source 11 can be held therebetween. The engaging part 40 includes a first pin 41 and a second pin 42.

A diameter of the first pin 41 is substantially the same as a diameter of the first round hole 12f formed on the base 12c of the heat sink 12. Further, a leading end 41a of the first pin 41 has a tapered shape. A diameter of the second pin 42 is substantially the same as a diameter of the second round hole 12g formed on the base 12c of the heat sink 12. Further, a leading end 42a of the second pin 42 has a tapered shape.

Figure 3B:
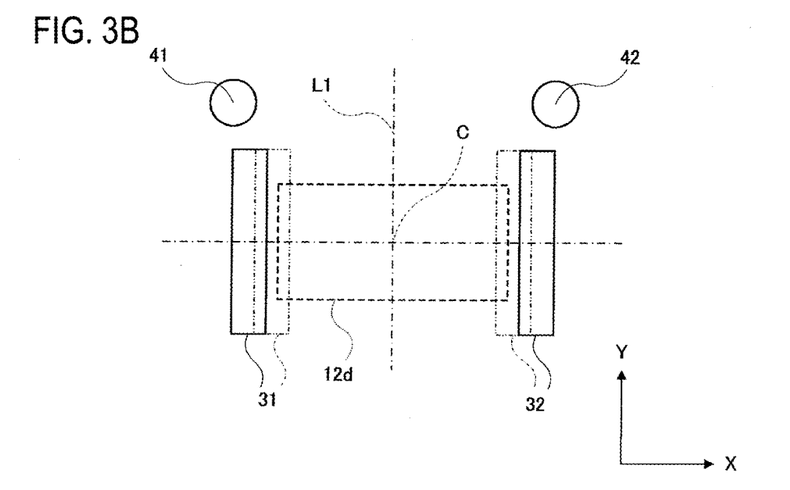

FIG. 3B is a plan view schematically showing a positional relationship among the first gripping member 31, the second gripping member 32, the first pin 41, the second pin 42 and the light source mounting portion 12d.

The first gripping member 31 and the second gripping member 32 are arranged along X direction and can be displaced along the X direction, respectively. An interval between the first gripping member 31 and the second gripping member 32 is changed by the displacement. In FIG. 3 B, initial positions of the first gripping member 31 and the second gripping member 32 are indicated by solid lines. Further, positions of the first gripping member 31 and the second gripping member 32 when gripping the light source 11 therebetween are indicated by two-dot chain lines. That is, the first gripping member 31 and the second gripping member 32 are adapted to grip the light source 11 therebetween by being displaced along the X direction from the initial position so as to reduce the interval.

The first pin 41 and the second pin 42 are extended in Z direction and arranged along the X direction. The first pin 41 and the second pin 42 are disposed so as to avoid the moving range in Y direction of the first gripping member 31 and the second gripping member 32. Further, the first pin 41 and the second pin 42 are arranged axisymmetrically with respect to a straight line L1 extending in a short direction of the light source 11. Here, the straight line L1 passes through a position C at which a central portion of the light source 11 held by the holding part 30 is disposed.

The first mechanism 60 is a mechanism for displacing the support part 50 along the Z direction. Further, the first mechanism 60 also serves to displace the first gripping member 31 and the second gripping member 32 along the X direction.

The second mechanism 70 is connected to the first mechanism 60 so as to allow the displacement of the support part 50 in XY plane. The third mechanism 80 is configured to have a state (state shown by a solid line) in which the displacement of the support part 50 in the XY plane is allowed and a state (state shown by a two-dot chain line) in which the displacement is restricted.

The control part 90 includes a CPU for executing various arithmetic processing, a ROM for storing various control programs and a RAM used as a work area for storing data and executing programs, etc. The control part 90 is adapted to control operations of at least the holding part 30, the first mechanism 60 and the third mechanism 80.

Further, the whole assembling apparatus 20 is movable in the XY plane by a suitable moving mechanism (not shown). The control part 90 controls the moving mechanism to move the assembling apparatus 20 between a place where the light source 11 (light emitting element package) prior to mounting is disposed and a place where the heat sink 12 to which the light source 11 is to be mounted is disposed.

Figure 4:
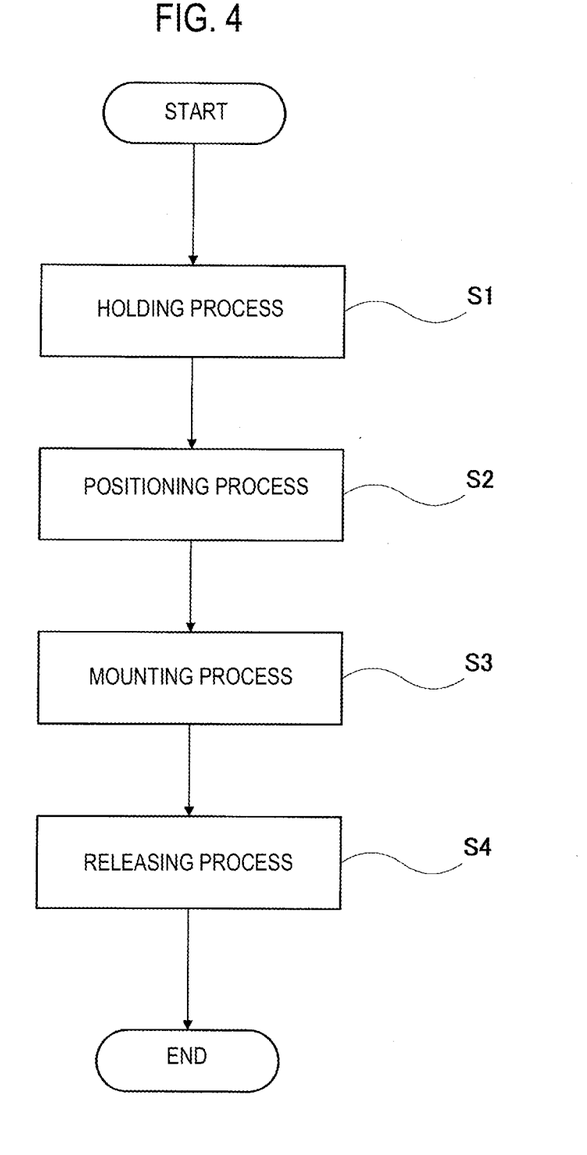
FIG. 4 is a flow chart showing an assembling method according to an exemplary embodiment of the present invention.

Next, an assembling method for mounting the light source 11 on the light source mounting portion 12d of the heat sink 12 using the above-described assembling apparatus 20 will be described with reference to FIG. 4 to FIG. 7. As shown in FIG. 4, the assembling method according to the present embodiment includes a holding process S1, a positioning process S2, a mounting process S3 and a releasing process S4.

Figure 5:
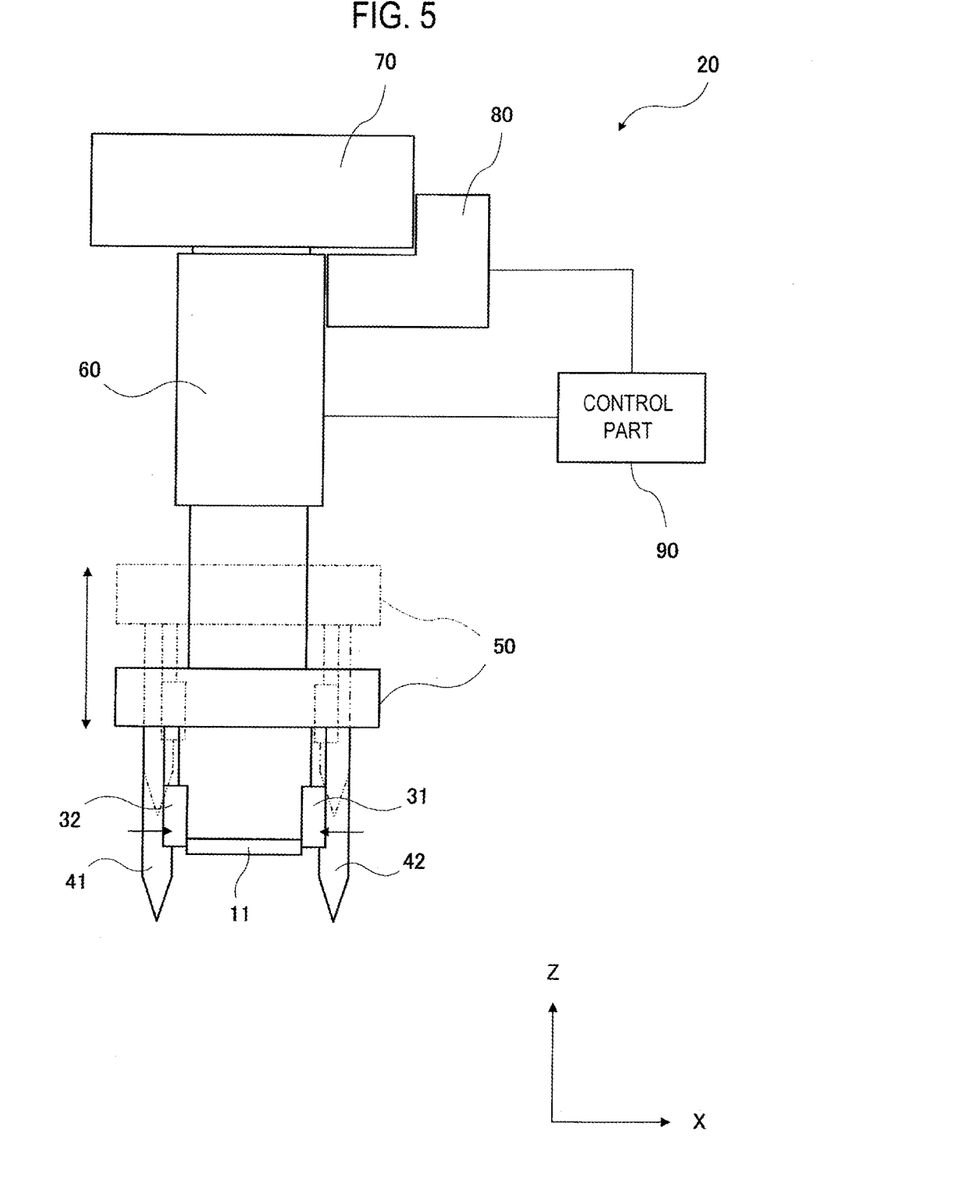
FIG. 5 is a view for explaining an operation of the assembling apparatus in a holding process of the assembling method.

FIG. 5 is a front view schematically showing the state of each part of the assembling apparatus 20 in the holding process S1. First, the control part 90 controls the moving mechanism to move the assembling apparatus 20 above the place where the light source 11 prior to mounting is disposed. Subsequently, the control part 90 controls the third mechanism 80 to restrict the displacement of the support part 50 in the XY plane.

Further, the control part 90 controls the first mechanism 60 to displace the support part 50 downward along the Z direction (two-dot chain line shows the position before displacement). Subsequently, the control part 90 controls the holding part 60 to reduce the interval between the first gripping member 31 and the second gripping member 32, thereby gripping the light source 11 therebetween. After gripping the light source 11, the control part 90 controls the first mechanism 60 to displace the support part 50 upward along the Z direction.

Figure 6:
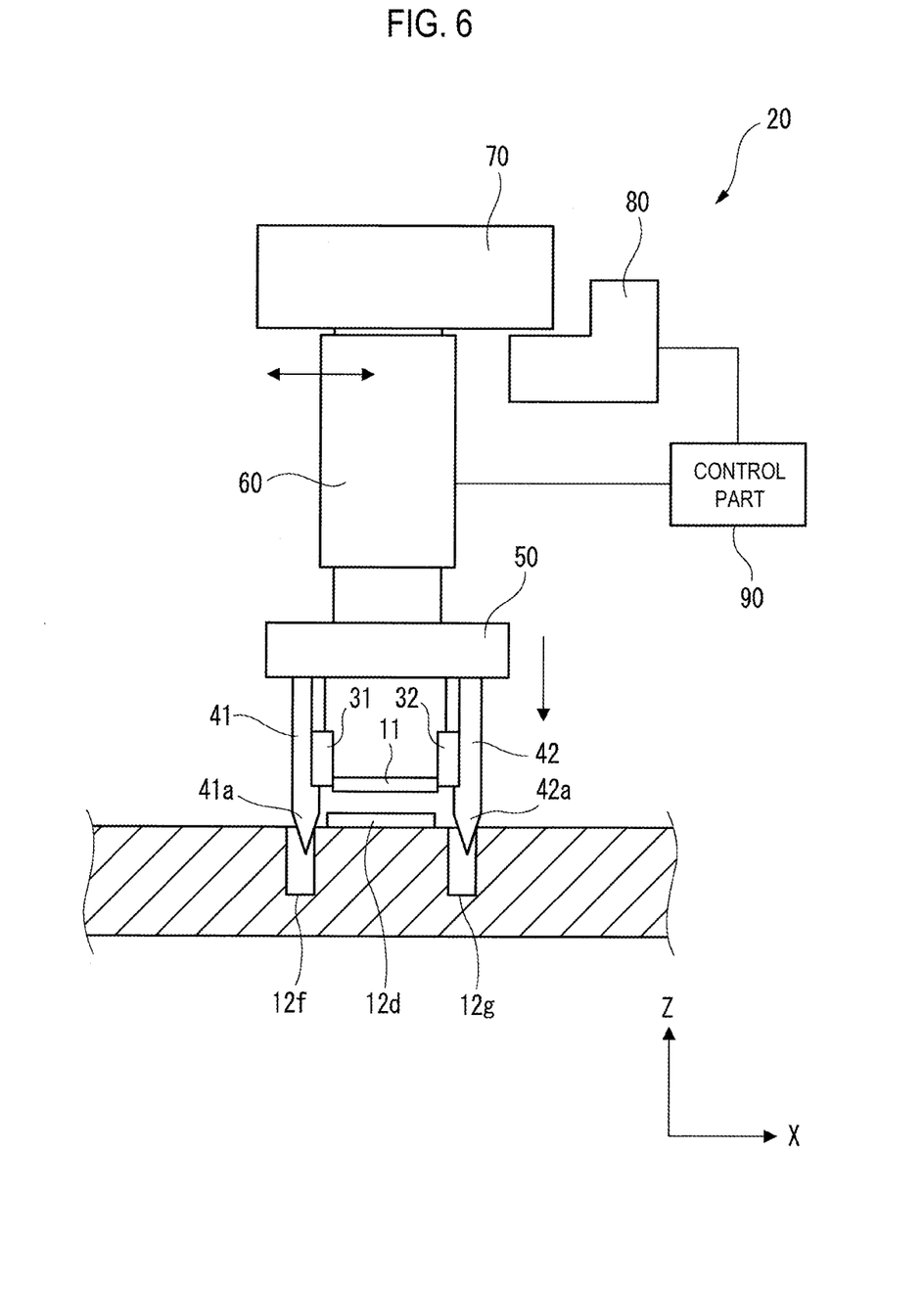
FIG. 6 is a view for explaining an operation of the assembling apparatus in a positioning process of the assembling method.

FIG. 6 is a front view schematically showing the state of each part of the assembling apparatus 20 in the positioning process S2. First, the control part 90 controls the moving mechanism to move the assembling apparatus 20 above the place where the heat sink 12 to which the light source 11 is to be mounted is disposed. Here, the heat sink 12 is disposed in such a way that the first round hole 12f and the second round hole 12g, which are formed on the base 12c, extend in the Z direction.

Subsequently the control part 90 controls the first mechanism 60 to displace the support part 50 downward along the Z direction. Thereby, the leading end 41a of the first pin 41 and the leading end 42a of the second pin 42, respectively, approach the first round hole 12f and the second round hole 12g, which are formed on the base 12c of the heat sink 12.

At this time, the control part 90 controls the third mechanism 80 to allow the displacement of the support part 50 in the XY plane.

The tapered configuration of the leading end 41a of the first pin 41 and the leading end 42a of the second pin 42 provides a centering function, allowing the support part 50 to move in the XY plane while the first pin 41 engages with the first round hole 12f and the second pin 42 engages with the second round hole 12g, whereby the light source 11 is set in position relative to the light source mounting portion 12d on the heat sink 12.

Figure 7:
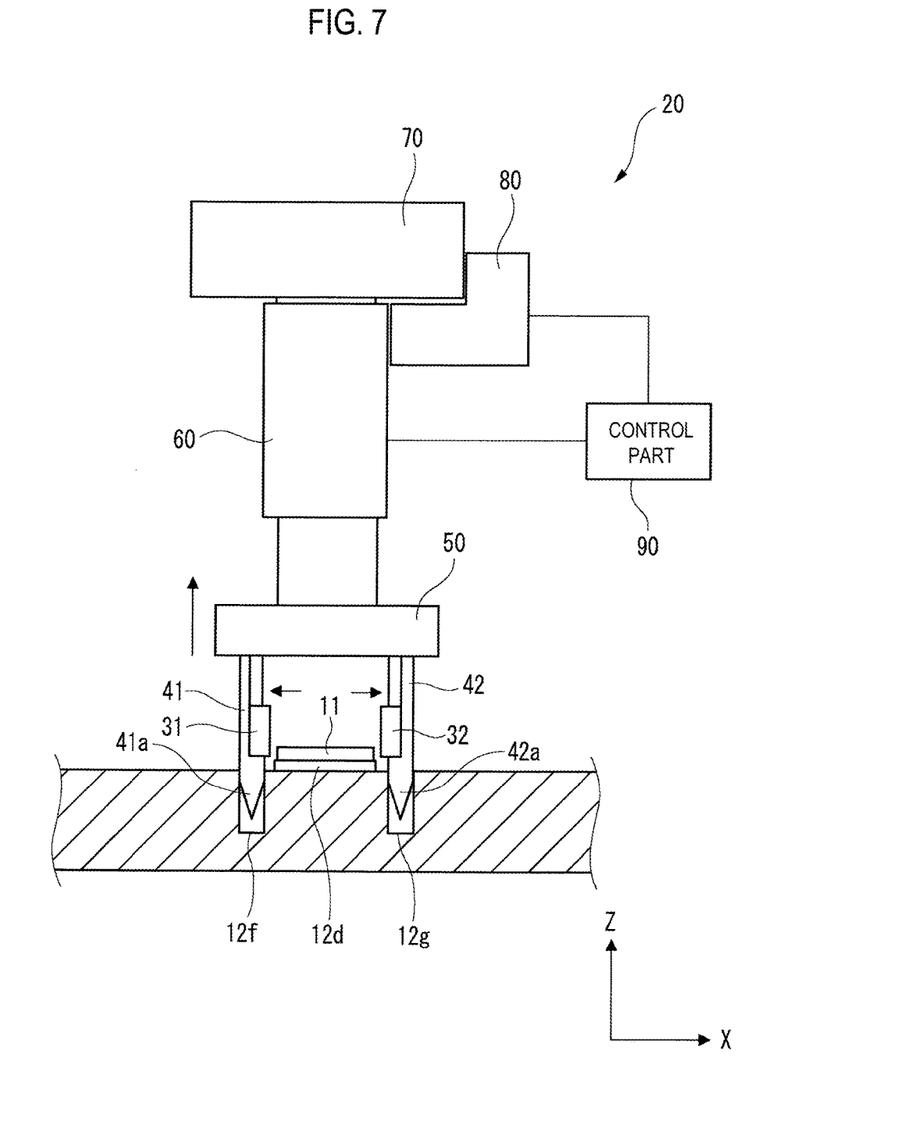
FIG. 7 is a view for explaining an operation of the assembling apparatus in a mounting process and a releasing process of the assembling method.

FIG. 7 is a front view schematically showing the state of each part of the assembling apparatus 20 in the mounting process S3 and the releasing process S4. When the position of the light source 11 relative to the light source mounting portion 12d is determined, the mounting process S3 is first performed. The control part 90 controls the third mechanism 80 to restrict again the displacement of the support part 50 in the XY plane.

In this state, the control part 90 controls the first mechanism 60 to displace the support part 50 further downward along the Z direction. The first pin 41 and the second pin 42 are inserted more deeply into the first round hole 12f and the second round hole 12g, respectively. Thereby, the light source 11 is mounted on the light source mounting portion 12d.

Subsequently, the releasing process S4 is performed. The control part 90 controls the holding part 30 to widen the interval between the first gripping member 31 and the second gripping member 32, thereby releasing the gripping of the light source 11 by both gripping members. Then, the control part 90 controls the first mechanism 60 to displace the support part 50 upward along the Z direction until the first pin 41 and the second pin 42 are separated from the first round hole 12f and the second round hole 12g. By doing so, the mounting of the light source 11 on the light source mounting portion 12d is completed.

As described above, the assembling apparatus 20 of the present embodiment mounts the light source 11 (an example of the first part) on the light source mounting portion 12d (an example of the second part) of the heat sink 12, in which the first and second round holes 12f, 12g (an example of the engaged part) extending in the Z direction (an example of the first direction) are formed. The holding part 30 has a structure capable of holding the light source 11. The engaging part 40 includes the first pin 41 and the second pin 42, which have a structure capable of engaging with the first round hole 12f and the second round hole 12g. The first pin 41 and the second pin 42 extend in the Z direction. The support part 50 supports the holding part 30 and the engaging part 40. The first mechanism 60 displaces the support part 50 in the Z direction. The second mechanism 70 allows the displacement of the support part 50 in the XY plane intersecting with the Z direction.

According to the configurations described above, the engagement of the engaging part 40 with the first and second round holes 12f, 12g (engaged parts) proceeds in association with the displacement of the support part 50 in the Z direction. Even in the case where some positional deviation between the engaging part and the engaged part occurs at the start of the engagement, the displacement of the support part 50 in the XY plane, which eliminates the positional deviation, is allowed by the second mechanism 70.

Since the engagement of the engaging part 40 with the engaged part is securely made, the position of the holding part 30 supported by the support part 50 with respect to the light source mounting portion 12d can be also determined with high accuracy. Accordingly, the light source 11 can be accurately mounted on the light source mounting portion 12d without using an image recognition technology associated with an increase in facility cost. Further, since the engagement of the engaging part 40 with the engaged part does not proceed in a state where a positional deviation occurs, it is possible to avoid the damage of these parts.

In the present embodiment, the third mechanism 80 restricts the displacement of the support part 50 in the XY plane. The control part 90 makes the second mechanism 70 to be effective (that is, controls the second mechanism 70 to allow the displacement of the support part 50) when the engaging part 40 is engaged with the engaged part and makes the third mechanism 80 to be effective (that is, controls the third mechanism 80 to restrict the displacement of the support part 50) when the holding part 30 mounts the light source 11 on the light source mounting portion 12*d*.

Specifically, at least in the case of positioning the holding part 30 relative to the light source mounting portion 12*d*, the displacement of the support part 50 in the XY plane is allowed. On the other hand, at least in the case of mounting the light source 11 on the light source mounting portion 12*d* by the holding part 30, the displacement of the support part 50 in the XY plane is restricted. In this way, a mounting operation of the light source 11 by the holding part 30 can be stably made. Accordingly, it is possible to mount the light source 11 on the light source mounting portion 12*d* with high accuracy.

The engaging part 40 includes the first pin 41 (an example of the first engaging member) and the second pin 42 (an example of the second engaging member). The first pin 41 can be engaged with the first round hole 12*f* (an example of the first engaged member) formed on the heat sink 12. The second pin 42 can be engaged with the second round hole 12*g* (an example of the second engaged member) formed on the heat sink 12.

In this case, the rotation of the support part 50 in the XY plane is prevented by two pins and therefore the holding part 30 can be more securely positioned relative to the light source mounting portion 12*d*.

While the present invention has been described with reference to a certain exemplary embodiment thereof, the scope of the present invention is not limited to the exemplary embodiments described above, and it will be understood by those skilled in the art that various changes and modifications may be made therein without departing from the scope of the present invention as defined by the appended claims.

In the above-described embodiment, a displacement direction (first direction: Z direction) of the support part 50 by the first mechanism 60 is perpendicular to a displacement direction (in the XY plane) of the support part 50, which is allowed by the second mechanism 70. However, it is just sufficient that the displacement direction of the support part 50 by the first mechanism 60 intersects with the displacement direction of the support part 50, which is allowed by the second mechanism 70, as long as the displacement direction of the support part 50 by the first mechanism 60 coincides with an extension direction of the engaging part 40 and the engaged part.

In the above-described embodiment, the engaging part 40 includes the first pin 41 and the second pin 42, which are, respectively, inserted into the first round hole 12*f* and the second round hole 12*g* as an engaged part. Here, the number of the pins is not limited to two. The number of the pins may be one, or three or more.

Further, a pin-like engaged part may be provided in the heat sink 12 and the engaging part 40 may be configured to have a hole for receiving the pin-like engaged part. Here, according to the configuration in which a hole as an engaged part is formed in the heat sink 12, the light emitted from the light source 11 mounted in the lamp unit 10 (an example of the lighting device) as a final product can be prevented from being hindered by the pin-like engaged part. Further, it is possible to suppress the forming cost of the heat sink 12.

In the above-described embodiment, the holding part 30 includes the first gripping member 31 and the second gripping member 32. The first gripping member 31 and the second gripping member 32 are arranged in the X direction (an example of the second direction) along the XY plane and have a structure capable of gripping the light source 11 by changing an interval therebetween in the X direction. In this case, it is possible to reliably and precisely hold the light source 11 with a simple configuration.

At this time, it is not essential that both the first gripping member 31 and the second gripping member 32 are displaced at the time of changing the interval. One of the first gripping member 31 and the second gripping member 32 may be displaced, as long as a relative distance therebetween can be changed.

Further, it is not essential that the holding part 30 includes the first gripping member 31 and the second gripping member 32. For example, a suction mechanism as disclosed in Patent Document 1 may be used, as long as the mechanism can hold the light source 11. Further, the light source 11 may be held by using a magnetic force.

In the above-described embodiment, the first pin 41 and the second pin 42 are arranged axisymmetrically with respect to the straight line L1 extending in a short direction of the light source 11. Here, the straight line L1 passes through the position C at which a central portion of the light source 11 held by the holding part 30 is disposed. However, the arrangement of the first pin 41 and the second pin 42 can be appropriately determined depending on the shape and structure of the heat sink 12 in the vicinity of the light source mounting portion 12*d*.

Figure 8A:
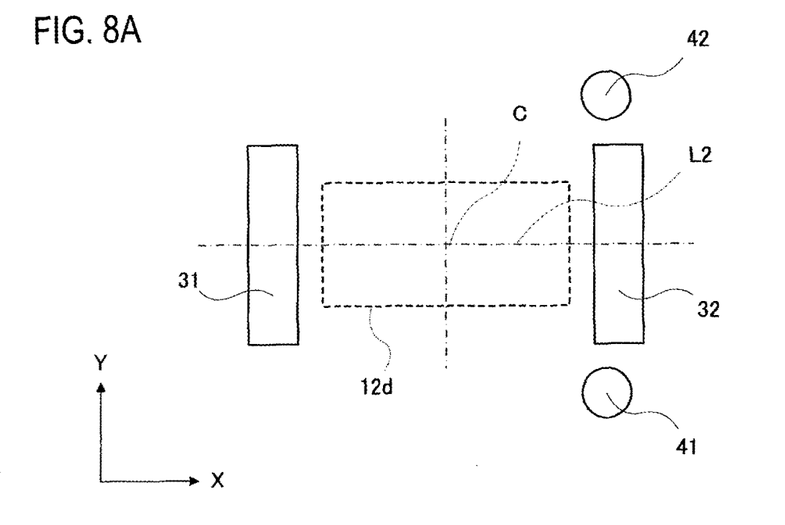
FIGS. 8A and 8B are views schematically showing a modification of an engaging part provided in the assembling apparatus.

For example, as shown in FIG. 8A, the first pin 41 and the second pin 42 may be arranged axisymmetrically with respect to a straight line L2 extending in a longitudinal direction of the light source 11. Here, the straight line L2 passes through the position C at which a central portion of the light source 11 held by the holding part 30 is disposed.

Figure 8B:
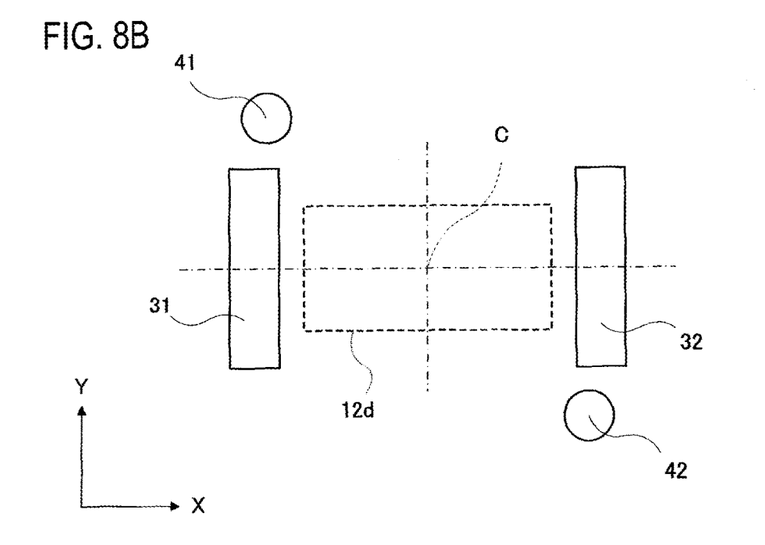

Further, as shown in FIG. 8B, the first pin 41 and the second pin 42 may be arranged point-symmetrically with respect to the position C at which a central portion of the light source 11 held by the holding part 30 is disposed. Especially, according to this arrangement, it is possible to significantly enhance the stability of the positioning operation.

In the above-described embodiment, the diameters of the first round hole 12*f* and the second round hole 12*g* are substantially the same as the diameters of the first pin 41 and the second pin 42. However, a diameter of one of the first round hole 12*f* and the second round hole 12*g* may be somewhat greater. According to this configuration, the engaging part 40 is allowed to displace within a range of positioning tolerance and therefore the positioning operation can be smoothly achieved.

In the above-described embodiment, the light source 11 (an example of the semiconductor light emitting device) provided in the lamp unit 10 mounted on a vehicle is mounted on the heat sink 12 by the assembling apparatus 20. However, an object on which the light source 11 is mounted is not limited to the heat sink 12, as long as the object is a support body having a structure capable of supporting the semiconductor light emitting device.

Further, application of the assembling apparatus 20 according to the present invention is not limited to the process for mounting the semiconductor light emitting device on the support body. The present invention can be applied to a proper assembling apparatus in which it is necessary to mount a first part on a second part with high positioning accuracy and it is required to suppress the facility cost.

What is claimed is:

1. An assembling method for assembling a first part to a second part using an assembling apparatus, the assembling apparatus including a holding part with gripping members, an engaging part which extends in a first direction and includes a first pin and a second pin, a support member which supports the holding part, a first mechanism which movably supports the support member in the first direction, a second mechanism which movably supports the first mechanism in a first plane intersecting with the first direction, a third mechanism, and a control part, said method comprising:

holding the first part by moving the gripping members of the holding part relative to the support member and the engaging part in a second plane parallel to the first plane such that the gripping members hold the first part, positioning the holding part relative to a second part in the second plane by engaging the engaging part extending in the first direction with an engaged part being formed on the second part and extending in the first direction while the first mechanism moves the support member in the first direction and the second mechanism allows the first mechanism to move in the first plane;

mounting, after the positioning, the first part held by the holding part on the second part while the first mechanism further moves the support member in the first direction; and releasing the holding of the first part mounted on the second part, wherein, in the positioning, the control part controls the third mechanism so as to move away from the first mechanism so that the engaging part is allowed to displace in the second plane, wherein, in the mounting, the control part controls the third mechanism to move toward the first mechanism so as to physically restrict displacement of the support member, and wherein, in the positioning, the first pin and the second pin of the engaging part engage with a first cylindrical hole and a second cylindrical hole of the engaged part, respectively, a diameter of the first cylindrical hole being larger than a diameter of the second cylindrical hole.

2. The assembling method according to claim 1, wherein the first part is a semiconductor light emitting device that is provided in a lighting device to be mounted on a vehicle, and wherein the second part is a support body configured to support the semiconductor light emitting device.

3. The assembling method according to claim 1, wherein the control part controls the third mechanism to move toward and away from the first mechanism in the first plane intersecting with the first direction.

4. The assembling method according to claim 1, wherein in the positioning, the holding part is moved in the second plane while the engaging part moves to follow a shape of the engaged part.

* * * * *